(12) United States Patent
Jo et al.

(10) Patent No.: US 12,409,681 B2
(45) Date of Patent: Sep. 9, 2025

(54) WHEEL AND MOBILITY INCLUDING THE SAME

(71) Applicants: Hyundai Motor Company, Seoul (KR); Kia Corporation, Seoul (KR); MOBINN Inc., Suwon-si (KR)

(72) Inventors: Sun Myoung Jo, Ansan-si (KR); Jin Choi, Seoul (KR); Hoon Chung, Hwaseong-si (KR)

(73) Assignees: HYUNDAI MOTOR COMPANY, Seoul (KR); KIA CORPORATION, Seoul (KR); MOBINN INC., Suwon-si (KR)

( * ) Notice: Subject to any disclaimer, the term of this patent is extended or adjusted under 35 U.S.C. 154(b) by 392 days.

(21) Appl. No.: 17/960,950

(22) Filed: Oct. 6, 2022

(65) Prior Publication Data
US 2023/0364946 A1   Nov. 16, 2023

(30) Foreign Application Priority Data
May 16, 2022   (KR) .................. 10-2022-0059824

(51) Int. Cl.
*B60C 7/14* (2006.01)
(52) U.S. Cl.
CPC .................. *B60C 7/146* (2021.08)
(58) Field of Classification Search
CPC ....... B60B 1/06; B60B 1/0223; B60B 1/0261; B60B 2900/311; B60B 2900/331; B60B 2900/313; B60B 2900/551; B60B 9/04; B60B 9/26; B25J 5/007

USPC .......................................................... 301/62
See application file for complete search history.

(56) References Cited

U.S. PATENT DOCUMENTS

| | | | | |
|---|---|---|---|---|
| 3,219,090 A | * | 11/1965 | Cislo ................ | B21C 47/34 152/7 |
| 6,170,544 B1 | | 1/2001 | Hottebart | |
| 6,286,572 B1 | * | 9/2001 | Chen ................ | B60D 1/52 152/84 |

(Continued)

FOREIGN PATENT DOCUMENTS

| CN | 111169219 A | 5/2020 |
|---|---|---|
| JP | H0459491 A | 2/1992 |

(Continued)

*Primary Examiner* — S. Joseph Morano
*Assistant Examiner* — Eva L Comino
(74) *Attorney, Agent, or Firm* — Slater Matsil, LLP (57) ABSTRACT

A wheel includes a deformable part reversibly deformable in shape by an external force, wherein the deformable part includes an inner region having a shape extending in a peripheral direction, an outer region having a shape extending in the peripheral direction and spaced apart outward from the inner region in a radial direction, and a spoke region provided between the inner region and the outer region and having a first side connected to the inner region and a second side connected to the outer region. The spoke region includes a first spoke region having a section protruding in a first of two peripheral directions and a second spoke region disposed at a first side of the first spoke region based on a second of the two peripheral directions opposite the first peripheral direction, wherein the second spoke region has a section protruding in the second peripheral direction.

18 Claims, 9 Drawing Sheets

(56) References Cited

U.S. PATENT DOCUMENTS

| | | | |
|---|---|---|---|
| 7,143,797 B2* | 12/2006 | Vannan | B60C 7/14 |
| | | | 152/310 |
| 2006/0144488 A1* | 7/2006 | Vannan | B60C 7/14 |
| | | | 152/7 |
| 2006/0174989 A1 | 8/2006 | Jones | |
| 2015/0174953 A1* | 6/2015 | Cron | B60C 7/18 |
| | | | 152/11 |
| 2016/0096400 A1* | 4/2016 | Nomura | B60B 9/04 |
| | | | 152/69 |
| 2018/0201058 A1 | 7/2018 | Apollonio et al. | |
| 2020/0276865 A1* | 9/2020 | Jo | B60B 9/28 |
| 2020/0324573 A1 | 10/2020 | Tardiff et al. | |
| 2021/0039431 A1 | 2/2021 | Long | |
| 2021/0188008 A1 | 6/2021 | Thompson | |
| 2021/0237511 A1 | 8/2021 | Kujawski et al. | |
| 2022/0388339 A1 | 12/2022 | Jo et al. | |

FOREIGN PATENT DOCUMENTS

| | | | | |
|---|---|---|---|---|
| JP | 2014189095 A | * | 10/2014 | ............ B60B 9/04 |
| JP | 2019521027 A | | 7/2019 | |
| JP | 2020083243 A | * | 6/2020 | |
| KR | 20120080807 A | | 7/2012 | |
| KR | 20140129656 A | | 11/2014 | |
| KR | 20180025749 A | * | 3/2018 | ............ B60C 7/10 |
| KR | 20220163785 A | | 12/2022 | |
| WO | WO-2014065263 A1 | * | 5/2014 | ............ B60B 9/26 |
| WO | WO-2021216550 A1 | * | 10/2021 | ............ B60B 9/26 |

\* cited by examiner

WHEEL AND MOBILITY INCLUDING THE SAME

CROSS-REFERENCE TO RELATED APPLICATIONS

This application claims the benefit of Korean Patent Application No. 10-2022-0059824, filed on May 16, 2022, which application is hereby incorporated herein by reference.

TECHNICAL FIELD

The present disclosure relates to a wheel and a mobility including the same.

BACKGROUND

As a demand for a mobility including a delivery robot other than traditional vehicles in the related art increases, studies are also being actively conducted on a wheel mounted on the mobility. In particular, because the mobility is often required to be movable on various terrains including stairs or obstacles as well as flat ground, there is an increasing demand for a wheel capable of moving in various types of environments.

In the related art, there have been disclosed an airless type wheel having a structure into which no air is injected so as to be movable in various types of environments and an active wheel having a structure capable of actively controlling a shape thereof suitably for the terrain.

However, the airless type wheel is not greatly deformed in shape because of the nature of a physically hard tire, which makes it difficult for the airless type wheel to move on stairs. The active wheel requires devices for controlling the shape of the wheel, which excessively complicates the structure of the wheel.

Therefore, there is a need to develop a new type of wheel having a simple structure while being capable of smoothly moving even on a complicated terrain such as stairs.

SUMMARY

The present disclosure relates to a wheel and a mobility including the same. Particular embodiments relate to a wheel having a structure capable of stably moving in various situations and a mobility including the same.

Embodiments of the present disclosure provide a new type of wheel having a simple structure while being capable of smoothly moving even on various terrains such as stairs.

An exemplary embodiment of the present disclosure provides a wheel including a deformable part configured to be reversibly deformed in shape by an external force, in which the deformable part includes an inner region having a shape extending in a peripheral direction P, an outer region having a shape extending in the peripheral direction and spaced apart outward from the inner region in a radial direction R, and a spoke region provided between the inner region and the outer region and having one side connected to the inner region and the other side connected to the outer region. The spoke region includes a first spoke region having a section protruding in a first peripheral direction P1 of two directions of the peripheral direction P and a second spoke region disposed at one side of the first spoke region based on a second peripheral direction P2 opposite to the first peripheral direction P1 of the two directions of the peripheral direction P and having a section protruding in the second peripheral direction P2.

The spoke region may be provided in plural, and the plurality of spoke regions may be disposed in the peripheral direction P.

The first spoke region may be longer than the second spoke region.

The first spoke region may be thicker than the second spoke region.

An interval A1 between the outer region and a section of the first spoke region, which protrudes by the largest amount in the first peripheral direction P1, may be smaller than an interval A2 between the inner region and a section of the first spoke region that protrudes by the largest amount in the first peripheral direction P1.

An interval B1 between the outer region and a section of the second spoke region, which protrudes by the largest amount in the second peripheral direction P2, may be smaller than an interval B2 between the inner region and a section of the second spoke region that protrudes by the largest amount in the second peripheral direction P2.

An interval A1 between the outer region and a section of the first spoke region, which protrudes by the largest amount in the first peripheral direction P1, may be larger than an interval B1 between the outer region and a section of the second spoke region that protrudes by the largest amount in the second peripheral direction P2.

An interval D1 between a region in which the first spoke region and the outer region meet and a region in which the second spoke region and the outer region meet may be larger than an interval D2 between a region in which the first spoke region and the inner region meet and a region in which the second spoke region and the inner region meet.

A thickness of the first spoke region at a portion where the first spoke region is connected to the inner region may be larger than a thickness of the first spoke region at a portion where the first spoke region is connected to the outer region.

A thickness of the second spoke region at a portion where the second spoke region is connected to the inner region may be larger than a thickness of the second spoke region at a portion where the second spoke region is connected to the outer region.

A portion where the first spoke region is connected to the outer region may be directed away in the peripheral direction P from a portion where the first spoke region is connected to the inner region.

A portion where the second spoke region is connected to the outer region may be directed away in the peripheral direction P from a portion where the second spoke region is connected to the inner region.

A portion where the first spoke region is connected to the outer region may be directed away in the second peripheral direction P2 from a portion where the first spoke region is connected to the inner region.

A portion where the second spoke region is connected to the outer region may be directed away in the second peripheral direction P2 from a portion where the second spoke region is connected to the inner region.

The plurality of spoke regions may be disposed at intervals that allow the first spoke region, which is provided in one spoke region among the plurality of spoke regions, and the second spoke region of the other spoke region spaced apart from the one spoke region in the first peripheral direction P1 to come into close contact with each other when an external force of a predetermined magnitude or higher is applied to the outer region in the radial direction R.

The wheel may further include a core part provided inside the inner region in the radial direction R and having one side fixedly coupled to the inner region and a connection part having one side connected to the core part and the other side connected to the outer region.

Another exemplary embodiment of the present disclosure provides a wheel including a deformable part configured to be reversibly deformed in shape by an external force, in which the deformable part includes an inner region having a shape extending in a peripheral direction P, an outer region having a shape extending in the peripheral direction P and spaced apart outward from the inner region in a radial direction R, and spoke regions provided between the inner region and the outer region and each having one side connected to the inner region and the other side connected to the outer region, in which the spoke regions are spaced apart from one another in the peripheral direction P. The spoke regions each include a first spoke portion extending outward from the inner region in the radial direction R, a second spoke portion extending from the first spoke portion in a first peripheral direction P1 of two directions of the peripheral direction P, and a third spoke portion extending outward from the second spoke portion in the radial direction R and connected to the outer region.

The first spoke portion may extend outward from the inner region in the radial direction R and extend to be directed in a second peripheral direction P2 opposite to the first peripheral direction P of the peripheral direction P, and the third spoke portion may extend outward from the second spoke portion in the radial direction R and extend to be directed in the second peripheral direction P2.

A region Z23 in which the second spoke portion and the third spoke portion of one spoke region provided in the deformable part meet may be spaced apart outward, in the radial direction R, from a region Z12 in which the first spoke portion and the second spoke portion meet in another spoke region of the two spoke regions that is spaced apart from one spoke region in the first peripheral direction P1 of the peripheral direction P.

Still another exemplary embodiment of the present disclosure provides a mobility including a wheel and a frame member to which the wheel is coupled, in which the wheel includes a deformable part configured to be reversibly deformed in shape by an external force, in which the deformable part includes an inner region having a shape extending in a peripheral direction P, an outer region having a shape extending in the peripheral direction P and spaced apart outward from the inner region in a radial direction R, and a spoke region provided between the inner region and the outer region and having one side connected to the inner region and the other side connected to the outer region. The spoke region includes a first spoke region having a section protruding in a first peripheral direction P1 of two directions of the peripheral direction P and a second spoke region disposed at one side of the first spoke region based on a second peripheral direction P2 opposite to the first peripheral direction P1 of the two directions of the peripheral direction P and having a section protruding in the second peripheral direction P2.

According to embodiments of the present disclosure, it is possible to provide a new type of wheel having a simple structure while being capable of smoothly moving even on various terrains such as stairs.

DETAILED DESCRIPTION OF ILLUSTRATIVE EMBODIMENTS

Hereinafter, a wheel and a mobility according to embodiments of the present disclosure will be described with reference to the drawings.

Wheel

Figure 1:
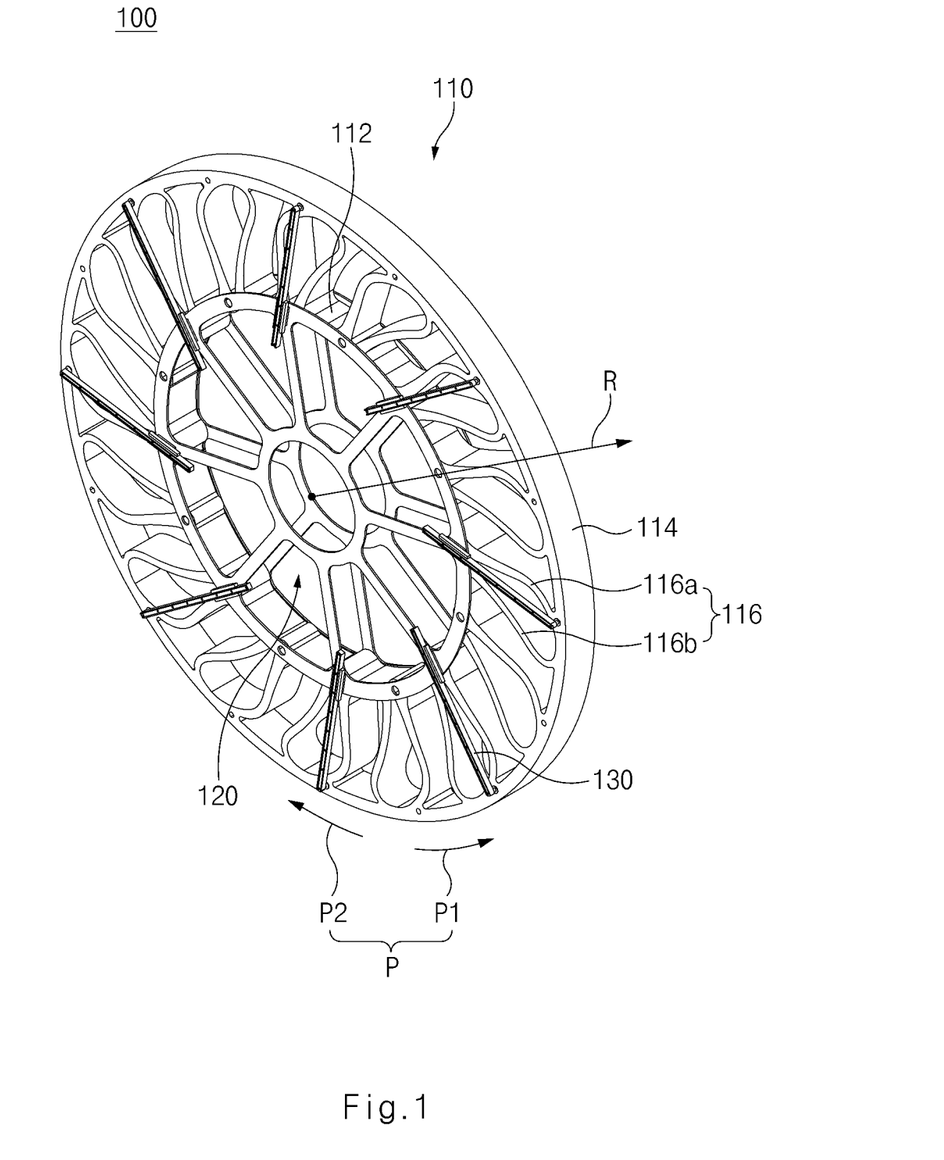
FIG. 1 is a view illustrating a wheel according to an embodiment of the present disclosure.
Figure 2:
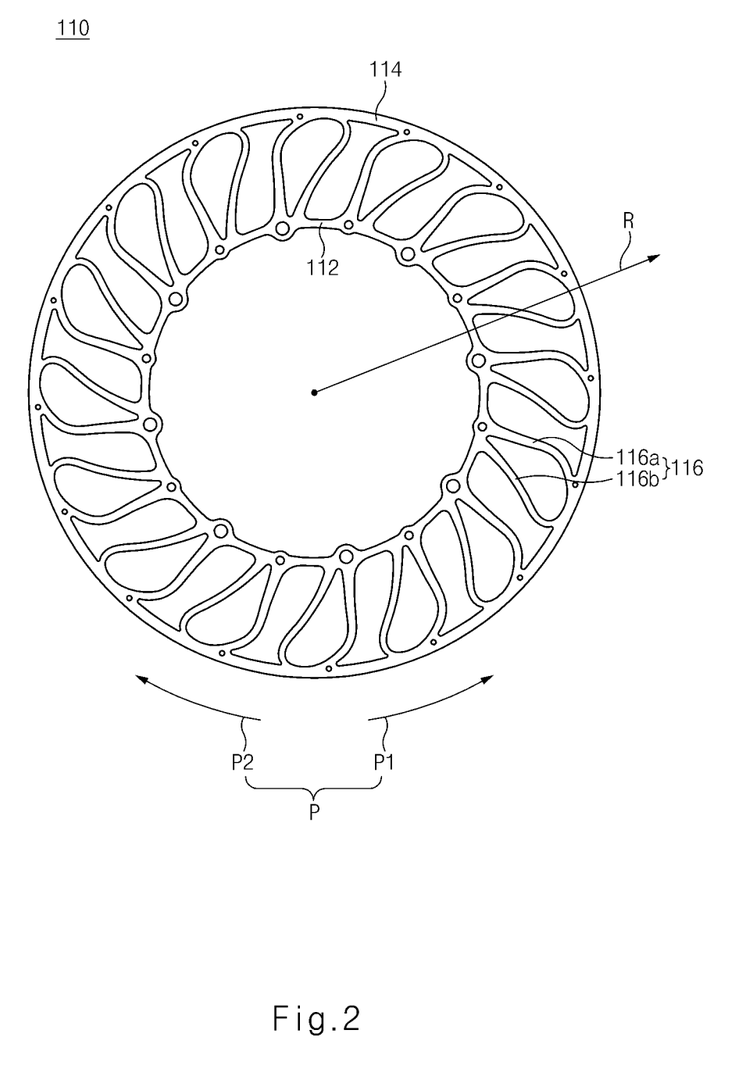
FIG. 2 is a view illustrating a deformable part of the wheel according to an embodiment of the present disclosure.
Figure 3:
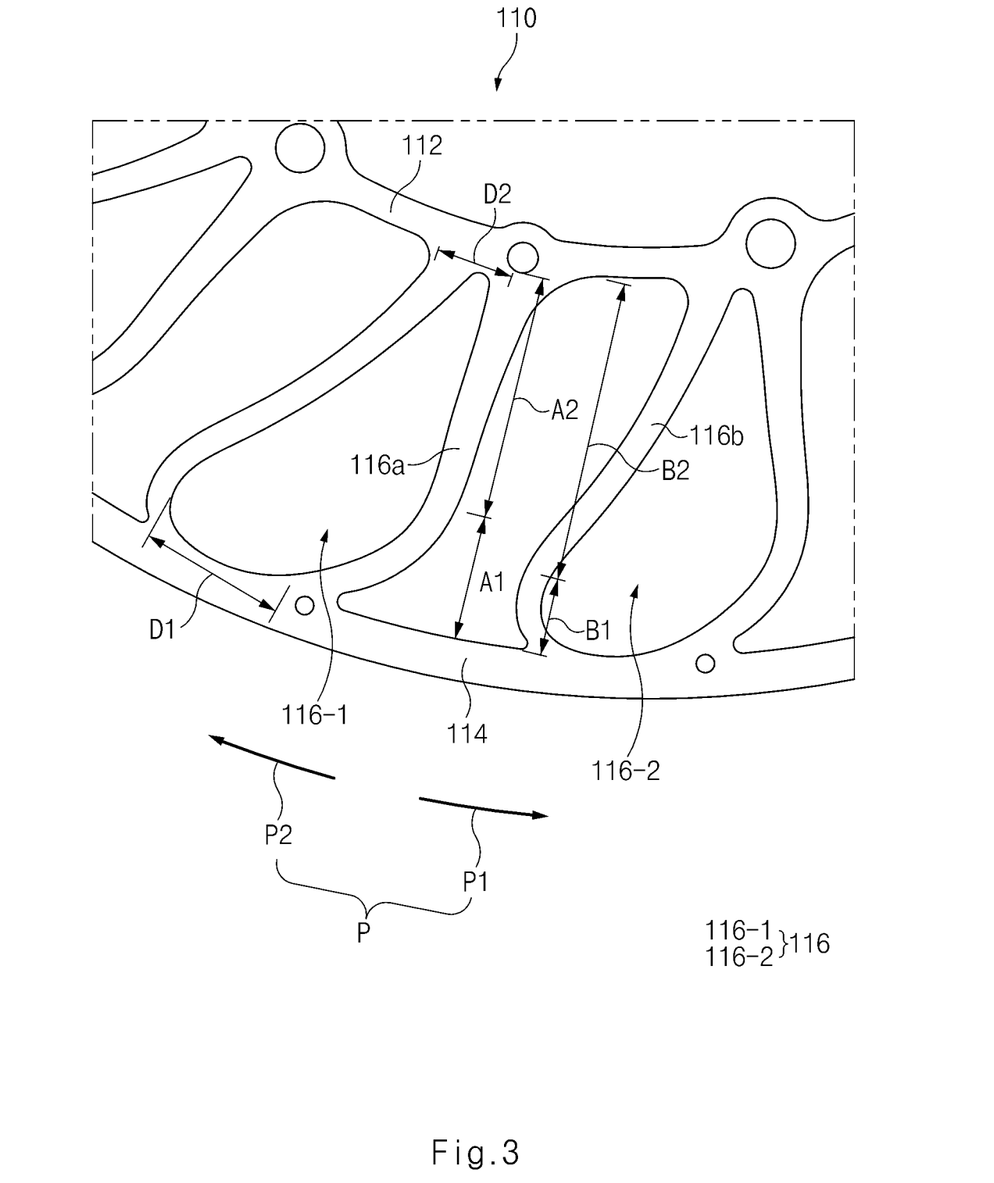
FIG. 3 is an enlarged view of a spoke region of the deformable part of the wheel according to an embodiment of the present disclosure.

FIG. 1 is a view illustrating a wheel according to an embodiment of the present disclosure, and FIG. 2 is a view illustrating a deformable part of the wheel according to an embodiment of the present disclosure. FIG. 3 is an enlarged view of a spoke region of the deformable part of the wheel according to an embodiment of the present disclosure.

A wheel 100 according to embodiments of the present disclosure may ensure stable movement performance by generating a resistive force against an external force when the wheel 100 moves on the flat ground. Further, the wheel 100 may improve ride quality as a trajectory of a center of the wheel has an inclined shape (slope) with a predetermined gradient without having a level difference when the wheel moves in a section having stepped portions such as stairs.

More specifically, referring to FIGS. 1 to 3, the wheel 100 according to embodiments of the present disclosure may include a deformable part 110 configured to be reversibly deformed in shape by an external force. That is, when the external force is applied to the deformable part 110, the deformable part 110 may be deformed in shape. When the external force is eliminated, the deformable part 110 may return to an original state. Therefore, the deformable part 110 may include a material having predetermined elasticity. For example, the deformable part 110 may include a rubber material. For example, the deformable part 110 may include styrene butadiene rubber (SBR) or may be made of SBR. However, the material of the deformable part 110 is not limited as long as the material has predetermined elasticity. Meanwhile, as illustrated in FIGS. 1 to 3, peripheries of the wheel 100 and the deformable part 110 according to embodiments of the present disclosure may each have an approximately circular shape in a state in which no external force is applied.

The components of the deformable part 110 may be integrated. However, according to embodiments of the present disclosure, the deformable part 110 may be divided into a plurality of regions.

More specifically, the deformable part 110 may include an inner region 112 having a shape extending in a peripheral direction P. For example, the inner region 112 may have a ring shape having a predetermined radius.

In addition, the deformable part 110 may further include an outer region 114 having a shape extending in the peripheral direction P and spaced apart outward from the inner region 112 in a radial direction R of the wheel 100. The outer region 114 may have a ring shape having a larger radius than the inner region 112. The outer region 114 is a region that first receives an external force from a ground surface, among the regions of the deformable part 110, during a process in which the wheel 100 moves. The outer region 114 may primarily support a load. More particularly, an approximately concentric relationship may be defined between the inner region 112 and the outer region 114.

In addition, the deformable part 110 may further include a spoke region 116 provided between the inner region 112 and the outer region 114 in the radial direction R and having one side connected to the inner region 112 and the other side connected to the outer region 114. Referring to the above-mentioned description, the inner region 112, the outer region 114, and the spoke region 116 may be integrated with one another.

Referring to FIGS. 1 and 2, the spoke region 116 may be provided in plural, and the plurality of spoke regions 116 may be disposed in the peripheral direction P of the wheel 100. More particularly, the plurality of spoke regions 116 may be provided at equal intervals in the peripheral direction P of the wheel 100.

The plurality of spoke regions 116 may each be divided into a plurality of regions. More specifically, the spoke region 116 may include a first spoke region 116a having a section protruding in a first peripheral direction P1 of the two directions of the peripheral direction P, and a second spoke region 116b disposed at one side of the first spoke region 116a based on a second peripheral direction P2 opposite to the first peripheral direction P1 of the two directions of the peripheral direction P and having a section protruding in the second peripheral direction P2. For example, as illustrated in FIGS. 1 to 3, a predetermined space may be defined between the first spoke region 116a and the second spoke region 116b in one spoke region 116, and a predetermined space may also be defined between the two adjacent spoke regions 116. As described below, the predetermined spaces may serve as spaces in which the spoke regions 116 are deformed when the external force is applied to the wheel 100.

According to an exemplary embodiment of the present disclosure, the plurality of spoke regions 116 of the wheel 100 may have the same shape or have the shapes corresponding to one another. In this case, the configuration in which the spoke regions 116 have the shapes corresponding to one another may be understood as including a case in which the spoke regions 116 have the same shape and a case in which the spoke regions 116 have shapes similar to one another to the extent that the spoke regions 116 have substantially the same function. However, the first and second spoke regions 116a and 116b provided in one spoke region 116 may be different in geometric shape. Hereinafter, the shapes of the first and second spoke regions 116a and 116b will be described in detail with reference to the drawings.

Figure 4:
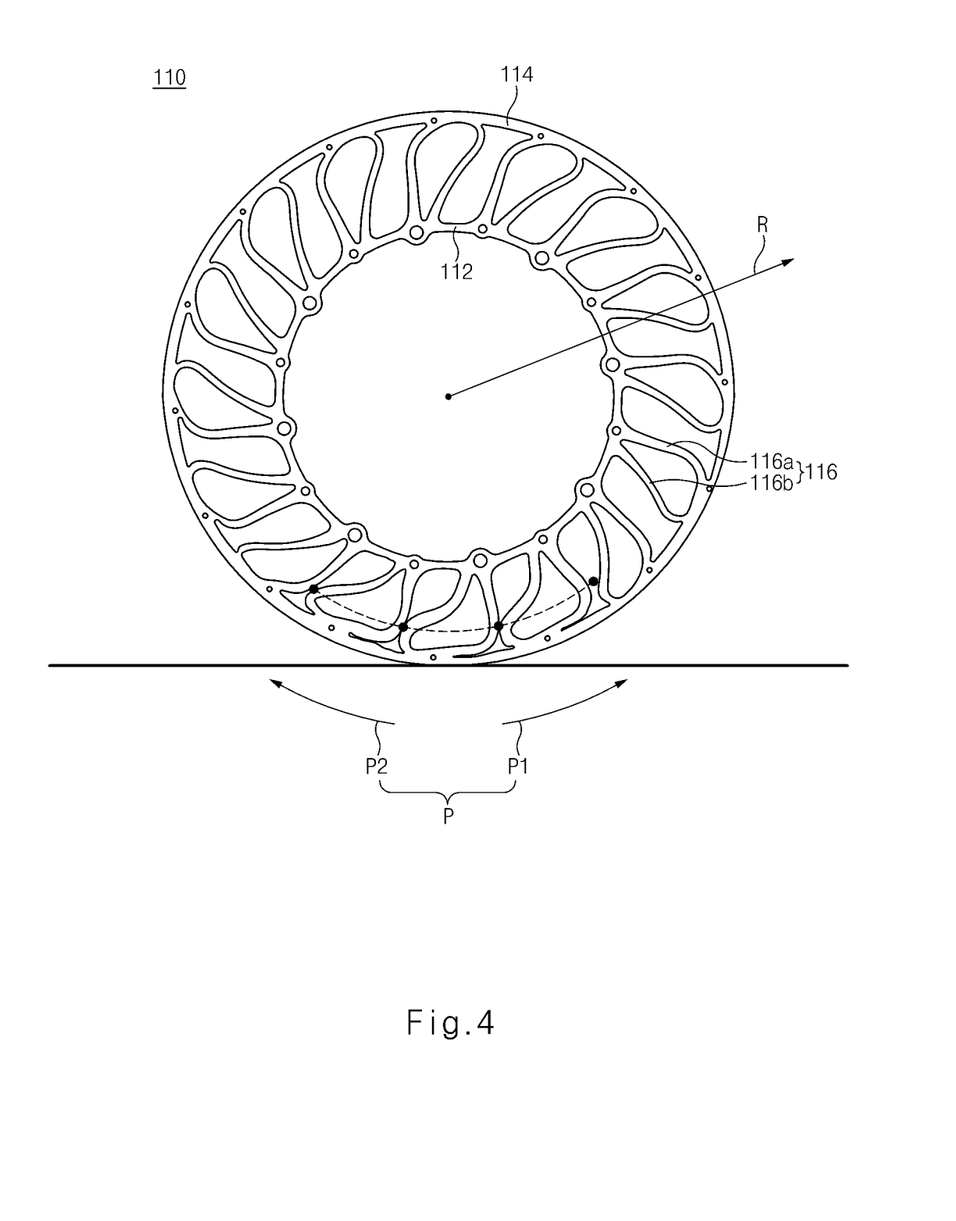
FIG. 4 is a view illustrating a shape of the deformable part when the wheel according to an embodiment of the present disclosure moves on the flat ground.
Figure 5:
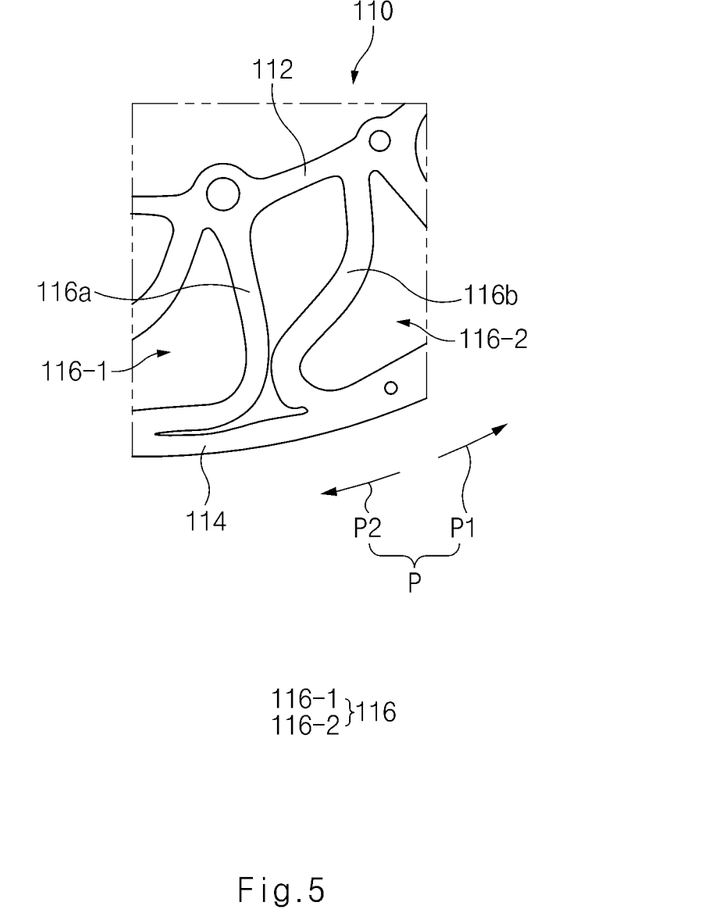
FIG. 5 is an enlarged view of the spoke region illustrated in FIG. 4.
Figure 6:
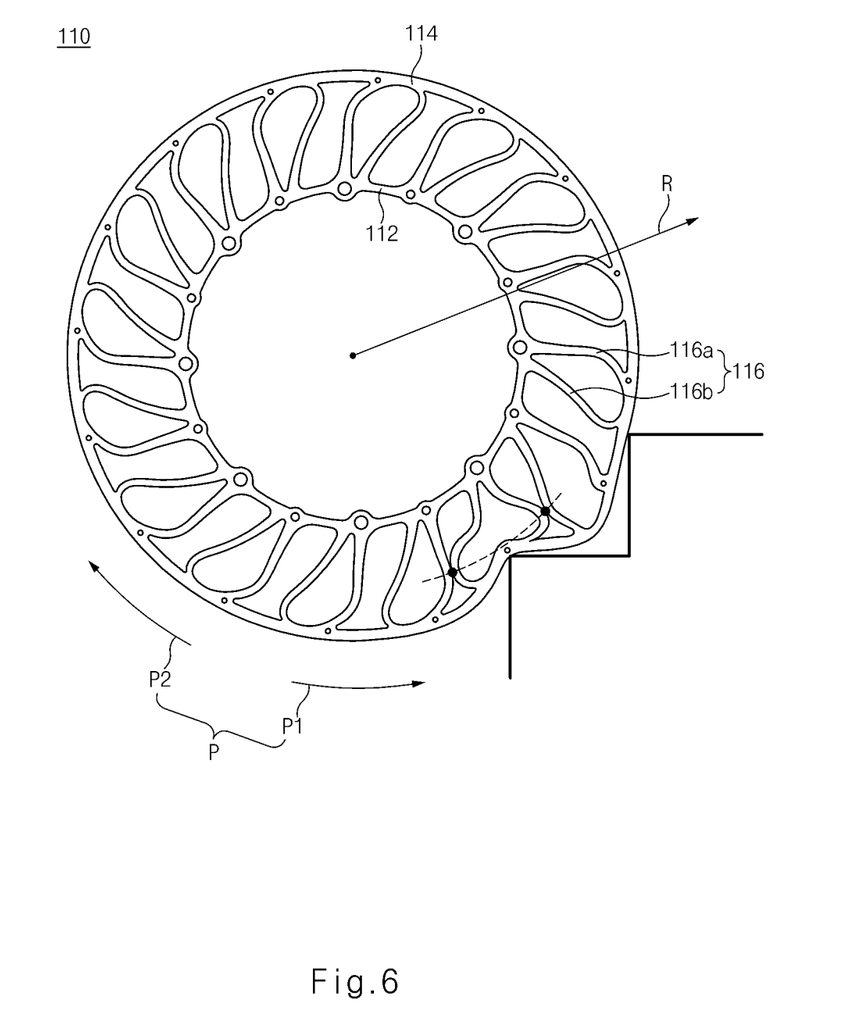
FIG. 6 is a view illustrating a shape of the deformable part when the wheel according to an embodiment of the present disclosure moves up the stairs.

FIG. 4 is a view illustrating a shape of the deformable part when the wheel according to an embodiment of the present disclosure moves on the flat ground, and FIG. 5 is an enlarged view of the spoke region illustrated in FIG. 4. FIG. 6 is a view illustrating a shape of the deformable part when the wheel according to an embodiment of the present disclosure moves up the stairs, and FIG. 7 is an enlarged view of the spoke region illustrated in FIG. 6.

Figure 7:
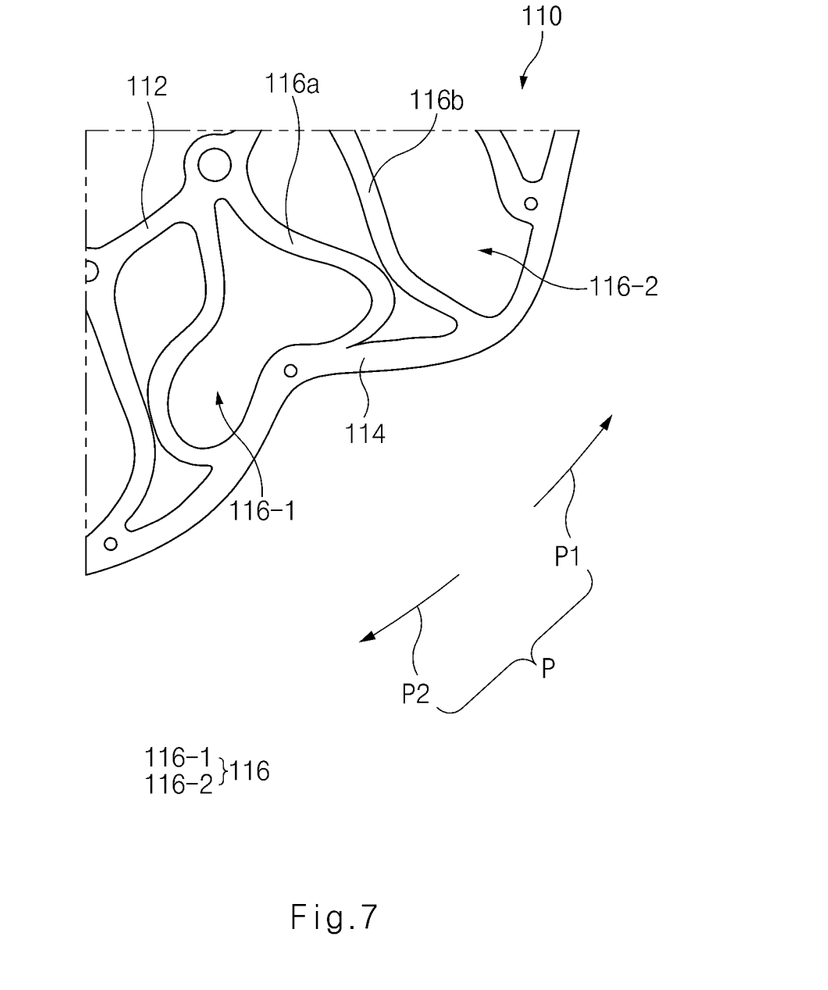
FIG. 7 is an enlarged view of the spoke region illustrated in FIG. 6.

Referring to FIGS. 4 to 7, when an external force is applied to the outer region 114, the spoke regions 116 provided between the inner region 112 and the outer region 114 are deformed in shape while a distance between the inner region 112 and the outer region 114 decreases. More specifically, the spoke regions 116 between the inner region 112 and the outer region 114 are pressed, such that the first and second spoke regions 116a and 116b may have crushed shapes. Meanwhile, examples in which the external force is applied to the outer region 114 may include a case in which the wheel including the deformable part 110 moves on a flat ground surface as illustrated in FIGS. 4 and 5, a case in which the wheel including the deformable part 110 moves up the stairs as illustrated in FIGS. 6 and 7, and a case in which the ground surface or stair presses the outer region 114.

In this case, as described above, the first spoke region 116a has the section protruding in the first peripheral direction P1, and the second spoke region 116b has the section protruding in the second peripheral direction P2. Therefore, according to embodiments of the present disclosure, the two adjacent spoke regions 116 may come into close contact with each other when the external force is applied to the deformable part 110 through the outer region 114.

More specifically, referring to FIGS. 4 to 7, the plurality of spoke regions 116 may be disposed at intervals that allow the first spoke region 116a of one spoke region 116-1 of the plurality of spoke regions 116 and the second spoke region 116b of the other spoke region 116-2, which is spaced apart from one spoke region 116-1 in the first peripheral direction P1, to come into close contact with each other when an external force of a predetermined magnitude or higher is applied to the outer region 114 in the radial direction R.

That is, referring to FIGS. 4 to 7, when an external force of a predetermined magnitude or higher is applied to the outer region 114 of the wheel 100 according to embodiments of the present disclosure, the two adjacent spoke regions 116 come into close contact with each other, such that the two spoke regions 116 may support each other, and the two spoke regions 116 may be prevented from being additionally deformed. Therefore, according to embodiments of the present disclosure, because the two adjacent spoke regions 116 support each other, a degree of deformation in the shape of the deformable part 110 may be reduced. Further, because a displacement of the mobility equipped with the wheel 100 may be minimized during the process in which the wheel 100 moves, the movement performance of the wheel 100 may be ensured.

In FIG. 4, the dotted line indicates a part of an imaginary circle having a center corresponding to a rotation center of the deformable part 110 and including a region in which the two adjacent spoke regions 116 come into close contact with each other while the wheel 100 moves on the ground surface. In FIG. 6, the dotted line indicates a part of an imaginary circle having a center corresponding to the rotation center of the deformable part 110 and including a region in which the two adjacent spoke regions 116 come into close contact with each other while the wheel 100 moves on the stairs. That is, according to embodiments of the present disclosure, the outer region 114 may primarily support a load of the wheel 100 and a load of the mobility equipped with the wheel 100 during the process in which the wheel 100 moves. The region in which the two adjacent spoke regions 116 come into close contact with each other and support each other may secondarily support the load of the wheel 100 and the load of the mobility. For example, the region in which the two spoke regions 116 come into close contact with each other and support each other may be a part of an imaginary load support member defined along the dotted line illustrated in FIGS. 4 and 6. However, the two spoke regions 116, which support each other while coming into close contact with each other, may be continuously changed over time because the deformable part 110 rotates during the process in which the wheel 100 moves.

More particularly, according to embodiments of the present disclosure, when the mobility equipped with the wheel 100 moves forward, the wheel 100 may rotate in the second peripheral direction P2. In addition, as illustrated in FIGS. 1 to 3, in one spoke region 116, the first spoke region 116a may be longer than the second spoke region 116b, and the first spoke region 116a may be thicker than the second spoke region 116b.

As described above, when the wheel 100 rotates in the second peripheral direction P2, the first spoke region 116a of one spoke region 116 faces the ground surface before the second spoke region 116b faces the ground surface. Therefore, when the wheel 100 rotates in the second peripheral direction P2, the first spoke region 116a is deformed first.

Therefore, to ensure the movement performance of the wheel 100 according to embodiments of the present disclosure, the deformation amount of the first spoke region 116a, which is deformed first before the second spoke region 116b is deformed during the process in which the wheel 100 moves, needs to be limited within a predetermined range. Therefore, an elastic modulus of the first spoke region 116a needs to be larger than an elastic modulus of the second spoke region 116b. In this case, the elastic modulus may be understood as the concept indicating a degree of deformation in shape when an external force is applied to the first spoke region 116a or the second spoke region 116b.

In this case, as described above, according to embodiments of the present disclosure, because the first spoke region 116a is thicker than the second spoke region 116b, the first spoke region 116a may have a relatively large elastic modulus. Therefore, it is possible to minimize a degree to which the first spoke region 116a is deformed in shape by the external force during the process in which the wheel 100 moves. As a result, when the external force is applied, the first spoke region 116a may more securely support the wheel 100 and the mobility equipped with the wheel 100, and the movement performance of the wheel 100 may also be improved.

Meanwhile, as described above, in one spoke region 116, the first spoke region 116a may be longer than the second spoke region 116b. In this case, it is possible to maximize a degree to which the first spoke region 116a protrudes in the first peripheral direction P1 when an external force is applied to the first spoke region 116a during the process in which the wheel 100 moves. Therefore, the first spoke region 116a may quickly meet the adjacent second spoke region 116b, such that the process in which the first and second spoke regions 116a and 116b support each other while coming into close contact with each other may be quickly performed.

Meanwhile, referring to FIGS. 1 to 3, in each of the spoke regions 116, an interval A1 between the outer region 114 and a section of the first spoke region 116a, which protrudes by the largest amount in the first peripheral direction P1, may be smaller than an interval A2 between the inner region 112 and a section of the first spoke region 116a that protrudes by the largest amount in the first peripheral direction P1. In addition, in each of the spoke regions 116, an interval B1 between the outer region 114 and a section of the second spoke region 116b, which protrudes by the largest amount in the second peripheral direction P2, may be smaller than an interval B2 between the inner region 112 and a section of the second spoke region 116b that protrudes by the largest amount in the second peripheral direction P2.

Referring to FIGS. 4 to 7, when the two adjacent spoke regions 116-1 and 116-2 come into close contact with each other as an external force is applied to the wheel 100, a section of the first spoke region 116a of one spoke region 116-1 of the two spoke regions 116-1 and 116-2 coming into close contact with each other, which protrudes by the largest amount in the first peripheral direction P1, comes into close contact with a section of the second spoke region 116b of the other spoke region 116-2 that protrudes by the largest amount in the second peripheral direction P2.

In this case, as described above, A1 is smaller than A2, and B1 is smaller than B2, such that the region in which the first spoke region 116a of one spoke region 116-1 and the second spoke region 116b of the other spoke region 116-2 come into close contact with each other may be positioned relatively toward the outside in the radial direction R of the wheel 100. Therefore, a degree of deformation of the deformable part 110 may be minimized. This configuration may correspond to the configuration in which the dotted line illustrated in FIGS. 4 and 6 is closer to the outer region 114 than is the inner region 112.

Meanwhile, referring to FIG. 3, the interval A1 between the outer region 114 and the section of the first spoke region 116a, which protrudes by the largest amount in the first peripheral direction P1, may be larger than the interval B1 between the outer region 114 and the section of the second spoke region 116b that protrudes by the largest amount in the second peripheral direction P2.

Therefore, as illustrated in FIGS. 4 to 7, when the first spoke region 116a of one spoke region 116-1 of the two adjacent spoke regions comes into close contact with the second spoke region 116b of the other spoke region 116-2 as the spoke regions 116 are deformed by the external force applied to the wheel 100, the section of the second spoke region 116b of the other spoke region 116-2, which protrudes by the largest amount in the second peripheral direction P2, is positioned outward in the radial direction R from the section of the first spoke region 116a of one spoke region 116-1 that protrudes by the largest amount in the first peripheral direction P1. In this case, the first spoke region 116a of one spoke region 116-1 may press, outward in the radial direction R, the second spoke region 116b of the other spoke region 116-2. The second spoke region 116b of the other spoke region 116-2 may press, inward in the radial direction R, the first spoke region 116a of one spoke region 116-1.

In addition, according to embodiments of the present disclosure, as illustrated in FIG. 3, in one spoke region 116, an interval D1 between a region in which the first spoke region 116a and the outer region 114 meet and a region in which the second spoke region 116b and the outer region 114 meet may be larger than an interval D2 between a region in which the first spoke region 116a and the inner region 112 meet and a region in which the second spoke region 116b and the inner region 112 meet. Therefore, as illustrated in FIG. 3, in one spoke region 116, a vacant space defined by the first and second spoke regions 116a and 116b may have an approximately water droplet shape. Therefore, when the spoke region 116 is deformed by an external force, a space, which is adjacent to the outer region 114 among spaces between the inner region 112 and the outer region 114, is sufficiently provided to allow the spoke region 116 to be deformed.

Referring to FIG. 3, a thickness of the first spoke region 116a at a portion where the first spoke region 116a is connected to the inner region 112 may be larger than a thickness of the first spoke region 116a at a portion where the first spoke region 116a is connected to the outer region 114. Further, a thickness of the second spoke region 116b at a portion where the second spoke region 116b is connected to the inner region 112 may be larger than a thickness of the second spoke region 116b at a portion where the second spoke region 116b is connected to the outer region 114. Therefore, when the spoke region 116 is deformed by an external force, the inner region 112 may securely support the first and second spoke regions 116a and 116b.

Meanwhile, according to embodiments of the present disclosure, the portion where the first spoke region 116a is connected to the outer region 114 may be directed away in the peripheral direction P from the portion where the first spoke region 116a is connected to the inner region 112. The portion where the second spoke region 116b is connected to the outer region 114 may be directed away in the peripheral direction P from the portion where the second spoke region 116b is connected to the inner region 112.

More particularly, as illustrated in FIGS. 1 to 3, the portion where the first spoke region 116a is connected to the outer region 114 may be directed away in the second peripheral direction P2 from the portion where the first spoke region 116a is connected to the inner region 112. The portion where the second spoke region 116b is connected to the outer region 114 may be directed away in the second peripheral direction P2 from the portion where the second spoke region 116b is connected to the inner region 112. Because the first and second spoke regions 116a and 116b are directed in the peripheral direction P as described above, the first and second spoke regions 116a and 116b of the spoke region 116 may always be deformed in a predetermined direction during the process in which the wheel 100 moves, thereby ensuring that the two adjacent spoke regions 116 come into close contact with each other.

Meanwhile, as illustrated in FIG. 1, the wheel 100 according to embodiments of the present disclosure may further include a core part 120 disposed inside the inner region 112 in the radial direction R and having one side fixedly coupled to the inner region 112. The core part 120 may be configured to support the deformable part 110. For example, as illustrated in FIG. 1, the inner region 112 may be inserted into the core part 120.

In addition, the wheel 100 may further include connection parts 130 each having one side connected to the core part 120 and the other side connected to the outer region 114. For example, the connection part 130 may have a rod shape. The connection part 130 may be provided in plural, and the plurality of connection parts 130 may be disposed in the peripheral direction P.

Hereinafter, a situation in which the deformable part 110 is deformed when the wheel according to embodiments of the present disclosure moves on a flat ground surface and a situation in which the deformable part 110 is deformed when the wheel moves on the stairs having a stepped shape difference will be described with reference to FIGS. 4 to 7.

As illustrated in FIGS. 4 and 5, when the wheel moves on the flat ground surface, the configuration in which running resistance of the wheel against the ground surface is low is advantageous in terms of efficiency. Therefore, in this case, the deformable part 110 needs to be less deformed. To this end, as described above, the two adjacent spoke regions 116 come into close contact with each other in the region adjacent to the outer region 114. In this case, the two adjacent spoke regions 116 may come into close contact with each other in a relatively large number of regions in order to disperse the load of the wheel and the load of the mobility. For example, FIG. 4 illustrates that the two spoke regions 116 come into close contact with each other at four points.

In contrast, as illustrated in FIGS. 6 and 7, when the wheel moves on the stairs, the deformable part 110 needs to be greatly deformed correspondingly to the stepped shape of the stairs. Therefore, in this case, the two adjacent spoke regions 116 may come into close contact with each other in a smaller number of regions than when the wheel moves on the flat ground surface. For example, FIG. 6 illustrates that the two spoke regions 116 come into close contact with each other at two points. When the two adjacent spoke regions 116 come into close contact with each other in a small number of regions, the load of the wheel and the load of the mobility, which are applied to the region in which the two spoke regions 116 come into close contact with each other, increase. Therefore, in the region in which the two spoke regions 116 come into close contact with each other, the first spoke region 116a or the second spoke region 116b may be relatively greatly deformed, and thus the shape of the deformable part 110 may be deformed to conform to the shape of the stairs.

Figure 8:
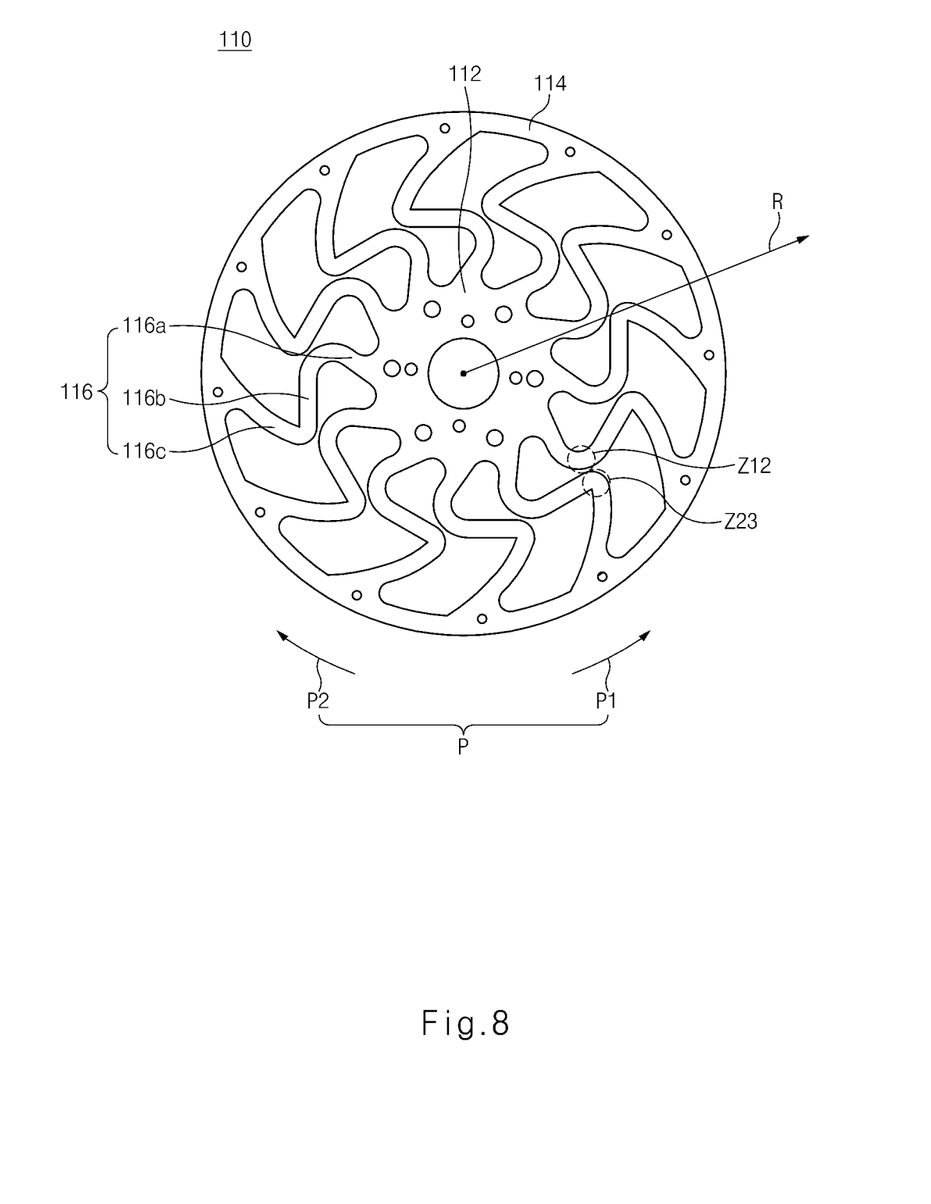
FIG. 8 is a view illustrating a deformable part of a wheel according to another embodiment of the present disclosure.
Figure 9:
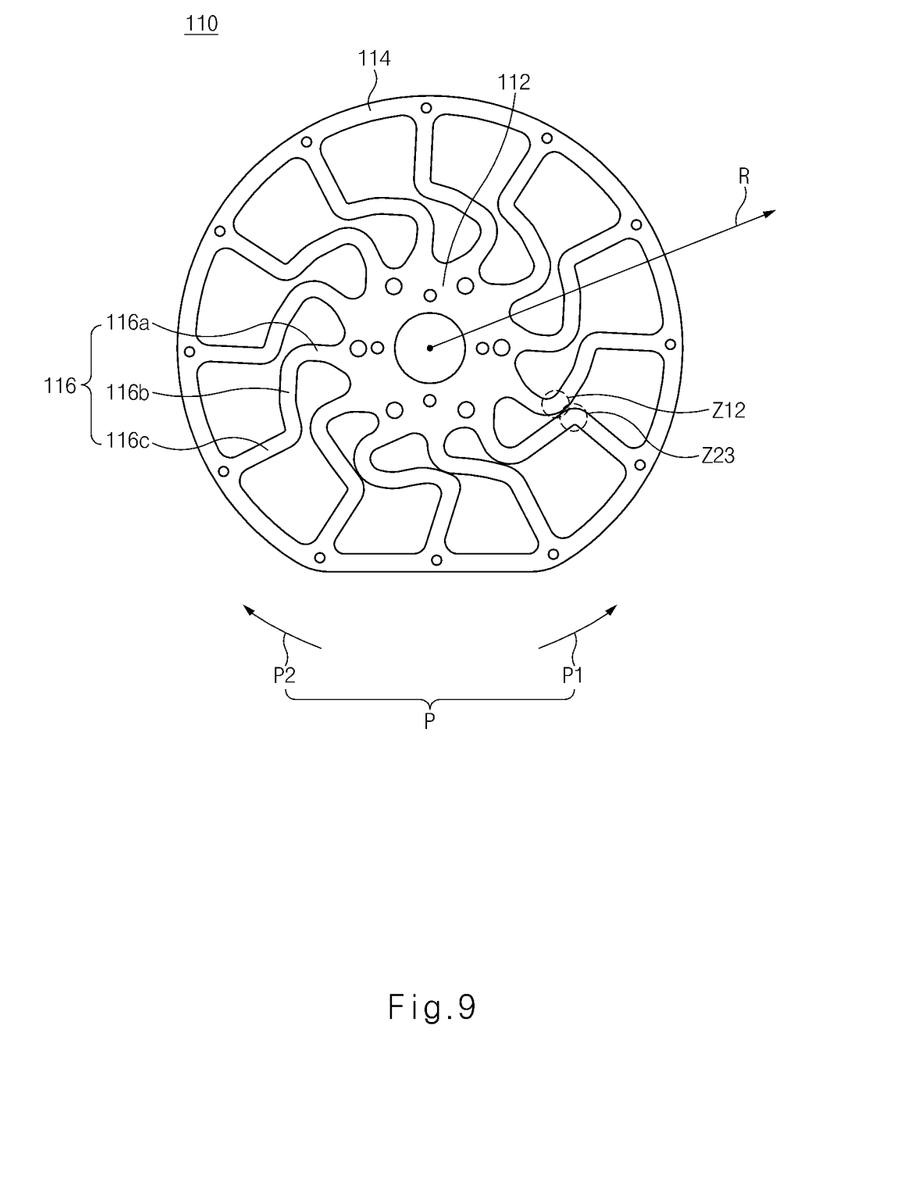
FIG. 9 is a view illustrating a shape of the deformable part when the wheel according to another embodiment of the present disclosure moves on the flat ground.

FIG. 8 is a view illustrating a deformable part of a wheel according to another embodiment of the present disclosure, and FIG. 9 is a view illustrating a shape of the deformable part when the wheel according to another embodiment of the present disclosure moves on the flat ground.

The above-mentioned contents related to the wheel according to the embodiment of the present disclosure may be equally applied to the wheel according to another embodiment of the present disclosure. However, another embodiment of the present disclosure differs from the above-mentioned embodiment of the present disclosure in terms of a shape of the spoke region 116 of the deformable part 110.

As illustrated in FIG. 8, another embodiment of the present disclosure differs from the above-mentioned embodiment of the present disclosure in that all of the plurality of spoke regions 116 provided in the deformable part 110 of the wheel and disposed to be spaced apart from one another in the peripheral direction P have substantially the same shape.

More specifically, as illustrated in FIG. 8, according to another embodiment of the present disclosure, the plurality of spoke regions 116 may each include a first spoke region 116a extending outward from the inner region 112 in the radial direction R, a second spoke region 116b extending from the first spoke region 116a in the first peripheral direction P1 of the two directions of the peripheral direction P, and a third spoke region 116c extending outward from the second spoke region 116b in the radial direction R and connected to the outer region 114. According to another embodiment of the present disclosure, the plurality of spoke regions 116 provided in the deformable part 110 may be understood as having an approximately S-shape or a zigzag shape. Unlike the above-mentioned embodiment of the present disclosure, a plurality of protruding sections (more specifically, two protruding sections) may be understood as being formed in each of the spoke regions 116.

More specifically, according to another embodiment of the present disclosure, as illustrated in FIG. 8, the first spoke region 116a may extend outward from the inner region 112 in the radial direction R and extend to be directed in the second peripheral direction P2. The third spoke region 116c may extend outward from the second spoke region 116b in the radial direction R and extend to be directed in the second peripheral direction P2. The second spoke region 116b may extend approximately in parallel with the peripheral direction P.

In addition, according to another embodiment of the present disclosure, a region Z23 in which the second spoke region 116b and the third spoke region 116c of one spoke region 116 provided in the deformable part 110 meet may be spaced apart outward, in the first peripheral direction P1 and the radial direction R, from a region Z12 in which the first spoke region 116a and the second spoke region 116b meet in another spoke region 116 of the two adjacent spoke regions that is spaced apart from one spoke region 116 in the first peripheral direction P1 of the peripheral direction P. In this case, as illustrated in FIG. 9, when the spoke regions 116 are deformed during the process in which the wheel moves, the region Z23 may support the region Z12, such that the two adjacent spoke regions 116 may support each other, like the above-mentioned embodiment of the present disclosure.

Hereinafter, a mobility equipped with the wheel according to embodiments of the present disclosure will be described. The above-mentioned description of the wheel according to embodiments of the present disclosure may also be equally applied to the mobility according to embodiments of the present disclosure to be described below.

Mobility

The mobility according to embodiments of the present disclosure may include the wheel 100 and a frame member to which the wheel 100 is coupled.

The wheel 100 may include the deformable part 110 configured to be reversibly deformed in shape by an external force.

The deformable part 110 may include the inner region 112 having a shape extending in the peripheral direction P, the outer region 114 having a shape extending in the peripheral direction P and spaced apart outward from the inner region in the radial direction R, and the spoke region 116 provided between the inner region 112 and the outer region 114 and having one side connected to the inner region 112 and the other side connected to the outer region 114.

The spoke region 116 may include the first spoke region 116a having the section protruding in the first peripheral direction P1 of the two directions of the peripheral direction P, and the second spoke region 116b disposed at one side of the first spoke region 116a based on the second peripheral direction P2 opposite to the first peripheral direction P1 of the two directions of the peripheral direction P and having the section protruding in the second peripheral direction P2.

For example, in the case in which the wheel 100 is mounted on the mobility according to embodiments of the present disclosure, the wheel 100 may be mounted such that the mobility moves forward when the wheel 100 rotates in the second peripheral direction P2. Alternatively, the wheel 100 may be mounted such that the mobility moves forward when the wheel 100 rotates in the first peripheral direction P1.

The present disclosure has been described with reference to the limited embodiments and the drawings, but the present disclosure is not limited thereto. The present disclosure may be carried out in various forms by those skilled in the art, to which the present disclosure pertains, within the technical spirit of the present disclosure and the scope equivalent to the appended claims.

What is claimed is:

1. A wheel comprising:
a deformable part that can be reversibly deformed in shape by an external force, wherein the deformable part comprises:
an inner region having a shape extending in a peripheral direction;
an outer region having a shape extending in the peripheral direction and spaced apart outward from the inner region in a radial direction; and
a spoke region provided between the inner region and the outer region and having a first side connected to the inner region and a second side connected to the outer region, wherein the spoke region comprises:
a first spoke region having a section protruding in a first of two peripheral directions; and
a second spoke region disposed at a first side of the first spoke region based on a second of the two peripheral directions, the second peripheral direction opposite to the first peripheral direction, wherein the second spoke region has a section protruding in the second peripheral direction,
wherein a thickness of the first spoke region at a portion where the first spoke region is connected to the inner region is larger than a thickness of the first spoke region at a portion where the first spoke region is connected to the outer region.

2. The wheel of claim 1, wherein:
the spoke region is one of a plurality of spoke regions, and each of the plurality of spoke regions is disposed in the peripheral direction.

3. The wheel of claim 2, wherein a first interval between the outer region and a section of the first spoke region, which protrudes by a largest amount in the first peripheral direction, is larger than a second interval between the outer region and a section of the second spoke region that protrudes by a largest amount in the second peripheral direction.

4. The wheel of claim 2, wherein a first interval between a region in which the first spoke region and the outer region meet and a region in which the second spoke region and the outer region meet is larger than a second interval between a region in which the first spoke region and the inner region meet and a region in which the second spoke region and the inner region meet.

5. The wheel of claim 2, wherein the plurality of spoke regions is disposed at intervals that allow the first spoke region, and the second spoke region spaced apart from the first spoke region in the first peripheral direction to come into direct contact with each other when an external force of a predetermined magnitude or higher is applied to the outer region in the radial direction.

6. The wheel of claim 1, wherein the first spoke region is longer than the second spoke region.

7. The wheel of claim 1, wherein the first spoke region is thicker than the second spoke region.

8. The wheel of claim 1, wherein a first interval between the outer region and a section of the first spoke region, which protrudes by a largest amount in the first peripheral direction, is smaller than a second interval between the inner region and a section of the first spoke region that protrudes by a largest amount in the first peripheral direction.

9. The wheel of claim 1, wherein a third interval between the outer region and a section of the second spoke region, which protrudes by a largest amount in the second peripheral direction, is smaller than a fourth interval between the inner region and a section of the second spoke region that protrudes by a largest amount in the second peripheral direction.

10. The wheel of claim 1, wherein a thickness of the second spoke region at a portion where the second spoke region is connected to the inner region is larger than a thickness of the second spoke region at a portion where the second spoke region is connected to the outer region.

11. The wheel of claim 1, wherein a portion where the first spoke region is connected to the outer region is directed away in the peripheral direction from a portion where the first spoke region is connected to the inner region.

12. The wheel of claim 1, wherein a portion where the second spoke region is connected to the outer region is directed away in the peripheral direction from a portion where the second spoke region is connected to the inner region.

13. The wheel of claim 1, wherein a portion where the first spoke region is connected to the outer region is directed away in the second peripheral direction from a portion where the first spoke region is connected to the inner region.

14. The wheel of claim 1, wherein a portion where the second spoke region is connected to the outer region is directed away in the second peripheral direction from a portion where the second spoke region is connected to the inner region.

15. The wheel of claim 1, further comprising:
a core part provided inside the inner region in the radial direction and having a first side fixedly coupled to the inner region; and
a connection part having a first side connected to the core part and a second side connected to the outer region.

16. A wheel comprising:
a deformable part that can be reversibly deformed in shape by an external force, wherein the deformable part comprises:
an inner region having a shape extending in a peripheral direction;
an outer region having a shape extending in the peripheral direction and spaced apart outward from the inner region in a radial direction; and
spoke regions provided between the inner region and the outer region, each of the spoke regions having a first side connected to the inner region and a second side connected to the outer region, wherein the spoke regions are spaced apart from one another in the peripheral direction, and wherein each of the spoke regions comprises:
a first spoke portion extending outward from the inner region in the radial direction;
a second spoke portion extending from the first spoke portion in a first peripheral direction of two directions of the peripheral direction; and
a third spoke portion extending outward from the second spoke portion in the radial direction and connected to the outer region.

17. The wheel of claim 16, wherein:
the first spoke portion extends outward from the inner region in the radial direction and extends to be directed in a second peripheral direction opposite to the first peripheral direction of the peripheral direction; and
the third spoke portion extends outward from the second spoke portion in the radial direction and extends to be directed in the second peripheral direction.

18. The wheel of claim 16, wherein a first region in which the second spoke portion and the third spoke portion of a first spoke region of the spoke regions meet is spaced apart outward, in the radial direction, from a second region in which the first spoke portion and the second spoke portion meet in a second spoke region of the spoke regions that is spaced apart from the first spoke region in the first peripheral direction of the peripheral direction.

* * * * *

UNITED STATES PATENT AND TRADEMARK OFFICE
CERTIFICATE OF CORRECTION

| | | |
|---|---|---|
| PATENT NO. | : 12,409,681 B2 | Page 1 of 1 |
| APPLICATION NO. | : 17/960950 | |
| DATED | : September 9, 2025 | |
| INVENTOR(S) | : Jo et al. | |

It is certified that error appears in the above-identified patent and that said Letters Patent is hereby corrected as shown below:

In the Claims

In Column 12, in Claim 5, Line 47, delete "region, and" and insert -- region and --.

Signed and Sealed this
Twenty-eighth Day of October, 2025

John A. Squires
*Director of the United States Patent and Trademark Office*